Figure 1:
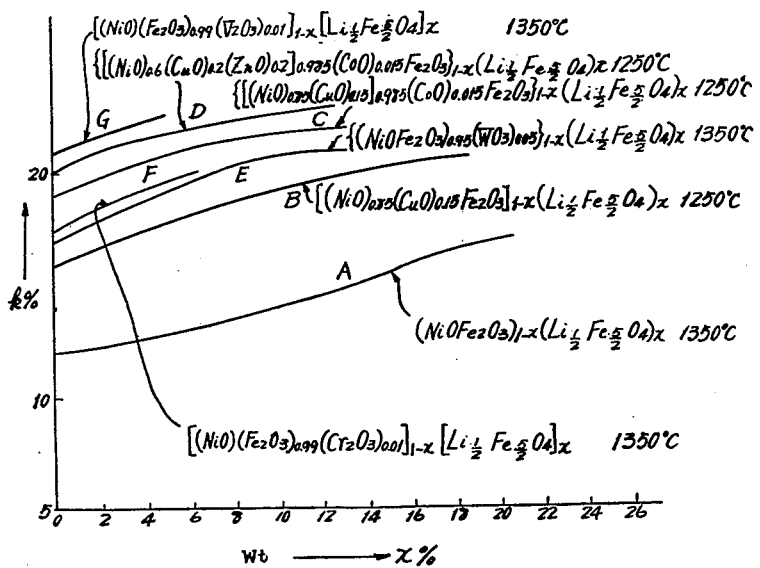

United States Patent Office 3,033,792
Patented May 8, 1962

3,033,792
METHOD OF MANUFACTURING FERRITE MAGNETOSTRICTION VIBRATORS
Yoshimitsu Kikuchi, 16 Kita Sanban-cho,
Sendai City, Japan
Filed May 23, 1958, Ser. No. 737,445
Claims priority, application Japan May 28, 1957
1 Claim. (Cl. 252—62.5)

This invention relates to a method of manufacturing improved magnetostriction vibrators.

Magnetostriction vibrators are substances which change their physical dimensions under the influence of a magnetic field applied on them, and are used for transducing electrical energy to acoustic energy, as well as transducing acoustic energy to electrical energy. The electromechanical coupling factor of a magnetostrictive substance is a coefficient which serves as a measure of the efficiency of a magnetostrictive vibrator made of the particular substance. In the present specification, this coupling factor is designated $k$ and is expressed in percent.

Conventional magnetostriction vibrators formed from thin sheets of pure nickel or magnetostrictive alloys, are expensive because of costly material and labor involved in production, and also are insufficient because of eddy current losses and lack of sharpness of mechanical resonance notwithstanding the lamination of thin sheets.

The principal object of this invention is to provide a method of making improved magnetostriction vibrators which have high electrical specific resistance and consequently negligible eddy current loss, and also have a relatively high electromechanical coupling factor approaching and even exceeding that of pure nickel.

Another object of this invention is to provide vibrators in accordance with the method which do not require expensive material of costly thin sheets, and also avoid the time consuming labor for insulation and lamination of the thin sheets as is done at present in providing metallic vibrators.

These objects and advantages of the present invention are attained by providing a vibrator composed of a sintered mixture of certain metallic oxides rather than laminated sheets.

This invention consists in the production of magnetostrictive vibrators at the temperature between 1000° C. and 1400° C. by sintering the molded powder of a mixture of oxides which are composed of nickel oxide by 10–70 mol percent, lithium oxide by 0.1–30 mol percent, ferric oxide by 30–60 mol percent and one kind or more than one kind of copper oxide, cobalt oxide, zinc oxide, cadmium oxide, vanadium oxide, chromium oxide and tungsten oxide by .1–65 mol percent as a whole, with such an auxiliary component as one or more than one kind of magnesium oxide, silicon oxide, manganese oxide, kaolin, orthoclase, borax, sodium oxide, potassium oxide, titanium oxide, arcenious oxide, bismuth oxide, calcium oxide, barium oxide, strontium oxide, lead oxide, antimony oxide, aluminum oxide and glass by 0–5 mol percent as a whole.

In accordance with the method of this invention, the various metallic oxides are pulverized and mixed together in proper proportions according to the above noted ranges. After the pulverized oxides have been thoroughly mixed, the mixture is heated at a temperature between 700° C. and 1000° C. in order to effect a preliminary sintering. The mixture is then re-pulverized into fine powders. The powder is then molded into a desired shape or block. The block is then sintered at a temperature between 1000° C. and 1400° C. for one-half to three hours in the presence of air. After the sintering process, the block is slowly cooled down to ambient temperature.

The magnetostrictive vibrators thus produced have small mechanical vibrational loss, very small eddy current loss and high electromechanical coupling factor, and moreover high uniformity when the vibrators are manufactered in large numbers. This statement holds not only in the audio frequency range, but also in the mega-cycle range.

For a better understanding of this invention, the improved qualities will be explained in the following:

In FIG. 1 are shown the characteristics of the invented ferrites of Ni—Li system. The curve A represents the electromechanical coupling factor $k$ of nickel-lithium ferrite which is produced at the temperature of 1350° C. by sintering the mixed oxide of which composition is expressed by 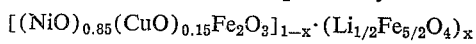, with varying the value of $x$. As clearly shown, the value of $k$ of nickel-ferrite can be increased by the addition of lithium oxide.

The curve B represents the characteristics of the mixed oxide of which composition is expressed by

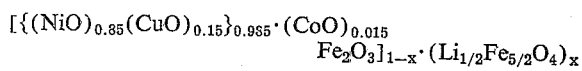

and sintered at 1250° C. By this investigation it is shown that the addition of CuO results in the remarkable increase of electromechanical coupling factor $k$ when the sintering temperature is low.

The curve C represents the characteristics when the mixed oxide of

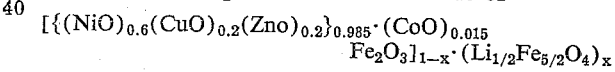

is sintered at 1250° C. This system of ferrite corresponds to ferrite composed of Ni—Cu—Li ferrite and CoO as an additional component; the characteristic of the former has been represented by the curve B. While the curve B comes in the range above 16% of the value of $k$, the curve C lies above 18%. This fact results in a considerable improvement in characteristics, which is presumably due to the effect of adding CoO.

The curve D represents the mixed oxide of

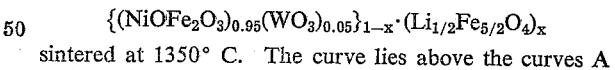

sintered at 1250° C., and corresponds to the characteristics when zinc oxide is added to the system represented by the curve C. The curve D lies above the curve C, in the range above $k=20\%$. This improvement can be said due to the effect of adding ZnO.

The curve E represents the mixed oxide of $$\{(NiOFe_2O_3)_{0.95}(WO_3)_{0.05}\}_{1-x} \cdot (Li_{1/2}Fe_{5/2}O_4)_x$$

sintered at 1350° C. The curve lies above the curves A and B which represent Ni—Li ferrites and Ni—Cu—Li ferrite respectively, and the value of $k$ in this case is more than 17%.

The curve F represents the mixed oxide of

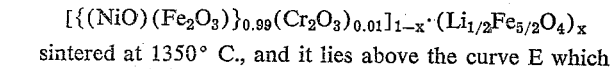

sintered at 1350° C., and it lies above the curve E which represents Ni—W—Li ferrites. The value of $k$ in this case is more than 17.5%.

The curve G represents the mixed oxide of

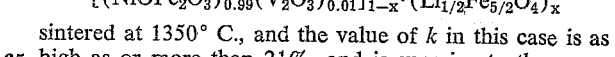

sintered at 1350° C., and the value of $k$ in this case is as high as or more than 21%, and is superior to the curve D which represents Ni—Cu—Li ferrites.

These curves E, F and G are for the material sintered at 1350° C., but the supplementary experiment on the effect of adding any one kind of CuO, CoO, ZnO and CdO verifies that the sintering temperature can be reduced to 1250° C. or lower, without sacrificing the value of $k$.

Figure 2:
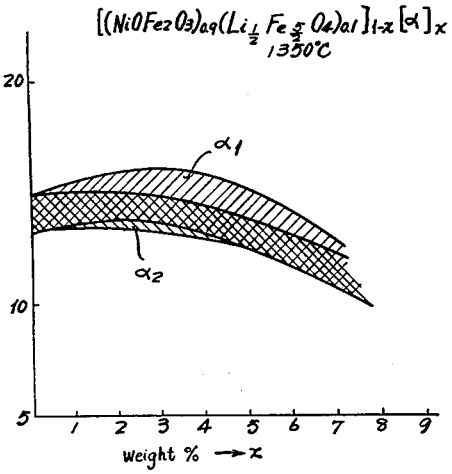

In FIG. 2 are shown the summarized results of the experiment on the effect of adding such an auxiliary component as kaolin, orthoclase, glass, borax etc., which are represented by [α] as

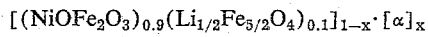

in this experiment. These auxiliary components are possible to be included into the products during the process of producing metallic oxides and/or during the process of pulverization, coming from the ceramic pot-mills and mortars. In this experiment, the sintering temperature is 1350° C. The auxiliary components investigated here are classified into two groups, $\alpha_1$ and $\alpha_2$. The $\alpha_1$-group represents the components which more or less improve the electromechanical coupling factor of the invented ferrite. To this group belong the following: MgO, SiO$_2$, MnO, kaolin, orthoclase, borax, Na$_2$O, K$_2$O, etc. and the α-group represents the components which do not seriously decrease the coupling factor. To this group belong the following: Al$_2$O$_3$, TiO$_2$, As$_2$O$_3$, CaO, BaO, SrO, PbO and Sb$_2$O$_3$. As a result, it is concluded that the inclusion of $\alpha_1$ and/or $\alpha_2$ by 0-5% as a whole, does not affect or in some cases does even improve the characteristics of the ferrite of this invention.

The summary of the inventor's entire experiment is described in the following:

(1) The effect of lithium oxide: When lithium oxide is added to nickel-ferrite, the electromechanical coupling factor $k$ increases and reaches above $k=15\%$, when the sintering temperature is about 1350° C. The adequate range of the addition is between 0.1 and 30 mol percent.

(2) The effect of CuO and CoO: When CuO is added to Ni—Li ferrite, the coupling factor $k$ can reach above 16%, in spite of the low sintering temperature as low as 1200° C. The addition of CoO further increases the value of $k$, as shown in the curve C, to reach above $k=19\%$. The adequate ranges of the addition are 0.1–65 mol percent for CuO, and 0.1–20 mol percent for CoO.

(3) The effect of ZnO or CdO: When ZnO or CdO is added to Ni—Ca—Co—Li ferrite, the characteristics are so much improved that the required magnetic bias decreases considerably, and that the electromechanical coupling factor $k$ becomes higher as well as permeability $\mu$; consequently, an excellent material can be produced which has a factor higher than 20%. Moreover, the necessary sintering temperature is lowered. As an additional component, CuO or CoO is effective to raise the value $k$ and lower the sintering temparture, but not effective to increase $\mu$. This effect on $\mu$ can mainly be introduced by the addition of ZnO, accompanied by the further increase of $k$ and decrease of the temperature.

The effect of ZnO on Ni—W—Li ferrite, Ni—Cr—Li ferrite and Ni—V—Li ferrite is almost the same as that above written.

The adequate range of ZnO or CdO is 0.1–40 mol percent in the ferrite.

(4) The effect of WO$_3$, Cr$_2$O$_3$ and V$_2$O$_3$: The addition of WO$_3$, Cr$_2$O$_3$ and/or V$_2$O$_3$ to Ni—Li ferrite does not lower the sintering temperature below 1350° C., however, improves the electromechanical coupling factor $k$ to a considerable extent. When the effectiveness in the improvement of $k$ is arranged in order among the three kinds of oxide, V$_2$O$_3$ is the best and makes the value $k$ above 21%, Cr$_2$O$_3$ the second best and makes the value $k$ above 17.5%, and WO$_3$ the last and makes the value above 17%. The adequate range of addition is 0.1–20 mol percent. The addition of CuO, CoO, ZnO and CdO to the ferrite of this system further decreases the sintering temperature and improves the value of $k$.

(5) The effect of the auxiliary components: The auxiliary components α can be the allowable inclusion to the ferrite, provided that the content is less than 5%. The $\alpha_1$-group improves more or less the value of $k$, but the $\alpha_2$-group does not seriously impair the characteristics, and does if the content exceeds 5%. The addition of the auxiliary components can be considered arbitrary and not always necessary. Some of them can be expected, however, useful to improve the characteristics to some extent in case not only when these are added to the mixture of the main oxides, but also when the other additional components exist in the mixture.

What I claim is:

A method of producing an improved magnetrostriction vibrator having an improved electromechanical coupling factor, comprising the steps of: pulverizing from 10 to 70 mol percent nickel oxide, .1 to 30 mol percent lithium oxide, 30 to 60 mol percent ferric oxide, and 0.1 to 65 mol percent of a metallic oxide selected from the group consisting of: copper, cobalt, zinc, cadmium, vanadium, chromium, and tungsten; mixing said oxides together to form a single mixture; heating said mixture to a temperature between 700 and 1000 degrees centigrade, in order to effect a preliminary sintering; repulverizing said mixture into a powder; molding the powder into a block of desired shape; sintering said block at a temperature of from 1000 to 1400 degrees centigrade for one-half to three hours in air; and cooling said block slowly to ambient temperature.

References Cited in the file of this patent

UNITED STATES PATENTS

| 2,565,111 | Albers-Schoenberg | Aug. 21, 1951 |
| 2,736,708 | Crowley et al. | Feb. 28, 1956 |

FOREIGN PATENTS

| 521,341 | Belgium | Jan. 9, 1954 |
| 202,838 | Australia | July 27, 1956 |

OTHER REFERENCES

Wijn et al.: Philips Tech. Rev., August 1954, page 56.
Weisz et al.: Cerimac Ind., May 1952, page 77.
Gorter: Philips Res. Rep., vol. 9, pages 295, 299, 300 (1954).
Harvey et al.: RCA Rev., September 1950, pages 344–349.